(12) United States Patent
Nomula et al.

(10) Patent No.: US 10,115,433 B2
(45) Date of Patent: Oct. 30, 2018

(54) SECTION IDENTIFICATION IN VIDEO CONTENT

(71) Applicant: A9.com, Inc., Palo Alto, CA (US)

(72) Inventors: Jagadeshwar Reddy Nomula, Fremont, CA (US); Erick Cantu-Paz, San Jose, CA (US); Francois Huet, Santa Cruz, CA (US)

(73) Assignee: A9.COM, INC., Palo Alto, CA (US)

( * ) Notice: Subject to any disclaimer, the term of this patent is extended or adjusted under 35 U.S.C. 154(b) by 0 days.

(21) Appl. No.: 15/837,977

(22) Filed: Dec. 11, 2017

(65) Prior Publication Data
US 2018/0102144 A1    Apr. 12, 2018

Related U.S. Application Data

(63) Continuation of application No. 14/849,418, filed on Sep. 9, 2015, now Pat. No. 9,858,967.

(51) Int. Cl.
| | | |
|---|---|---|
| *G11B 27/06* | (2006.01) | |
| *G11B 27/10* | (2006.01) | |
| *G10L 15/26* | (2006.01) | |
| *G11B 27/32* | (2006.01) | |

(52) U.S. Cl.
CPC ............ *G11B 27/06* (2013.01); *G10L 15/265* (2013.01); *G11B 27/105* (2013.01); *G11B 27/32* (2013.01)

(58) Field of Classification Search
CPC ..... G10L 15/265; G11B 27/06; G11B 27/105; G11B 27/32
See application file for complete search history.

(56) References Cited

U.S. PATENT DOCUMENTS

| | | |
|---|---|---|
| 6,160,950 A | 12/2000 | Shimazaki |
| 6,430,357 B1 | 8/2002 | Orr |
| 9,858,967 B1 * | 1/2018 | Nomula .................. G11B 27/06 |
| 2007/0253678 A1 | 11/2007 | Sarukkai |
| 2011/0047163 A1 * | 2/2011 | Chechik ............ G06F 17/30781 |
| | | 707/741 |
| 2013/0036442 A1 | 2/2013 | Wingert |
| 2013/0110509 A1 | 5/2013 | Cath et al. |
| 2014/0163956 A1 | 6/2014 | Tsech |
| 2015/0296228 A1 | 10/2015 | Chen |
| 2017/0229156 A1 * | 8/2017 | Avedissian ............. G11B 27/34 |

* cited by examiner

*Primary Examiner* — Huy T Nguyen
(74) *Attorney, Agent, or Firm* — Hogan Lovells US LLP

(57) ABSTRACT

Video content can be analyzed to identify particular sections of the video content. Speech to text or similar techniques can be used to obtain a transcription of the video content. The transcription can be indexed (e.g., timestamped) to the video content. Information describing how users are interacting with or consuming the video content (e.g., social media information, viewing history data, etc.) can be collected and used to identify the particular sections. Once the particular sections have been identified, other services can be provided. For example, custom trailers and summaries of the video content can be generated based on the identified sections. Additionally, the video content can be augmented to include additional information relevant to the particular sections, such as production information, actor information, or other information. The additional information can be added so as not to interfere with the important sections.

20 Claims, 10 Drawing Sheets

SECTION IDENTIFICATION IN VIDEO CONTENT

This application is a continuation of allowed U.S. application Ser. No. 14/849,418 entitled "SECTION IDENTIFICATION IN VIDEO CONTENT," filed Sep. 9, 2015, which is incorporated herein by reference for all purposes.

BACKGROUND

Users are increasingly utilizing electronic devices to view and interact with various types of content. For example, in addition to watching video content, a user may read reviews of, and comment on, video content such as movies, television programs, and internet videos. Finding specific scenes or popular quotes within the video content can be difficult unless the user knows the title of the video content and the context and/or timing of the scene. For example, if the user is interested in finding a scene with a favorite quote, the user might have no option but to choose different chapters and then seek (e.g., fast forward, rewind, or interact with a seek bar) a specific time or scene within the video content. Additionally, for streaming video, this can be time consuming, as it may require additional loading each time the user seeks a new time. If the user is not sure which movie includes the searched for quote or scene, the process may become more time consuming and potentially frustrating as the search may need to be repeated across multiple movies before the scene is identified.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the above-referenced and other deficiencies in conventional approaches to identifying items using an electronic device. In particular, various embodiments provide for identifying portions of video content, as well as generating new video content using the identified portions.

For example, techniques described herein include obtaining a text representation of video content. This may include generating the text representation using speech to text (STT) or similar techniques, or retrieving a crowd-sourced or machine transcription of a video from an online source that is annotated with timing information that links the transcription to the video content. Portions of the video content (quotes, shots, scenes, etc.) can be identified in the video content based on how users interact with the video. For example, viewing habits of users as they watch the videos can be analyzed. Additionally, or alternatively, social media information can be used to identify popular portions of the video content (e.g., commonly quoted scenes). Once the popular portions of the video content are identified, new video content can be generated using the popular portions. Additionally, classifiers can be trained based on the identified portions of the video content and used to automatically identify portions of different video content, such as newly released video content.

As used herein, video content may include any digital content including a plurality of image data (e.g., still images) and accompanying audio data. Video content can be associated with a frame rate at which the image data is displayed. The video content can be encoded using various digital encoding formats and may be stored on various storage media.

Various other functions and advantages are described and suggested below as may be provided in accordance with the various embodiments.

Figure 1:
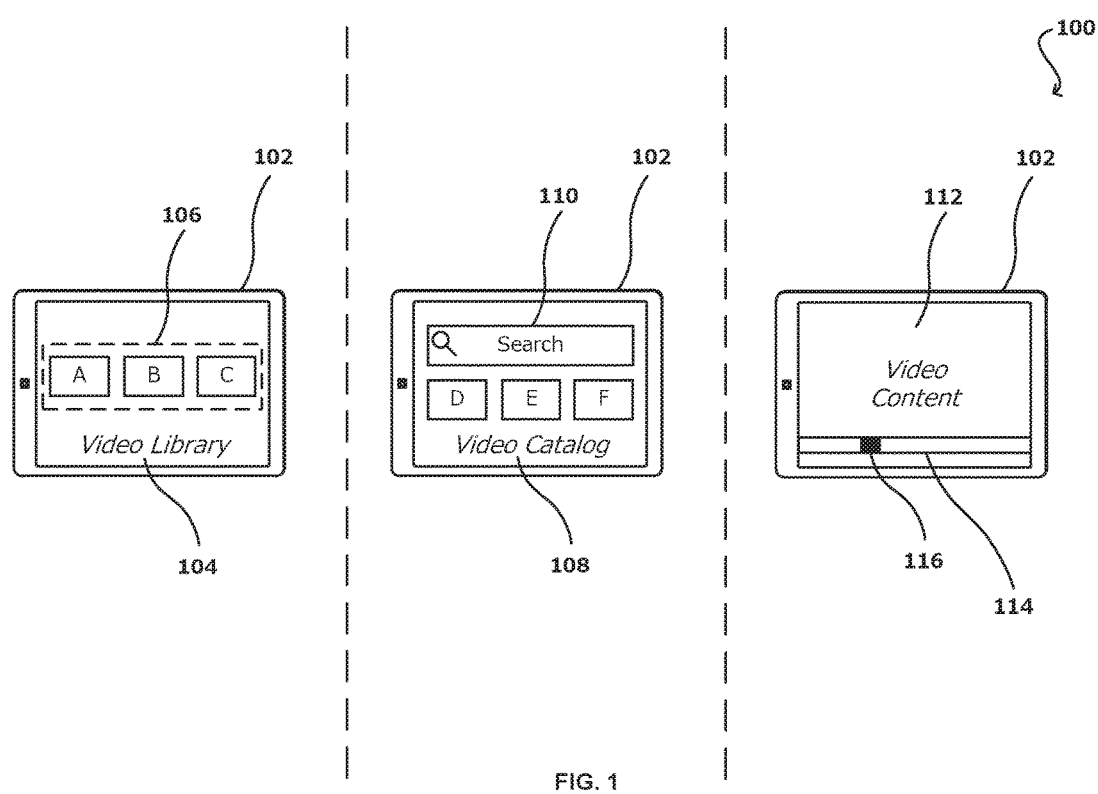
FIG. 1 illustrates examples of selecting video content using a client device.

FIG. 1 illustrates examples 100 of selecting video content using a client device. Although a portable computing device (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others.

In the example of FIG. 1, a user can access video content using a client device 102. Client device 102 can access video content stored locally on client device 102, stored remotely on an accessible storage device, and/or through a video streaming service. For example, a user can browse video content available in a video library 104. Video library 104 can include video content owned by the user. The user can browse visual representations 106 of available videos in video library 104 Similarly, a user may access a video service through client device 102. The video service may include a video catalog 108 that includes various videos the user may access. A search function 110 may be provided which enables the user to search for video content by title, actor, genre, or other criteria. However, such search functionality does not typically enable users to search for particular portions or scenes within the video content. Instead, once a title is selected, the corresponding video content 112 can be displayed on client device 102. A control bar 114, or similar control, can be provided to enable the user to navigate video content 112. For example, a slider 116 can be selected by the user and dragged to a position corresponding to a particular time index of video content 112.

Unfortunately, such manual searching can be time consuming and provide a frustrating user experience. For example, it may be difficult to make small adjustments using slider 116, making it difficult to change to a particular time index or causing the user to skip over the portion of content the user is seeking. Additionally, if the user has selected video content that does not include the portion for which the user is searching (e.g., if the user has misremembered the video content title), the user will have wasted time searching for a scene that does not exist.

Accordingly, approaches in accordance with the various embodiments provide for generating indexed sequences of video content. As referred to herein, indexed sequences can refer to a searchable representation of video content that is indexed to the video content at a plurality of temporal reference points. For example, an indexed sequence may include a transcript of the video content that is regularly annotated to include time stamps at predetermined sequence interval times. The indexed sequences may be generated using speech-to-text (STT) or similar processing, and/or may be based on crowd-sourced or machine transcribed transcriptions.

Various approaches also enable other services to use the indexed sequences to generate modified video content for a user. For example, a video service may generate a custom trailer or a video summary that includes particular portions (e.g., key plot points, popular scenes, etc.). In another example, an advertising service may generate an augmented video that includes advertising points selected at time indices based on the timing of particular portions of the video content (e.g., adding advertisement breaks that do not interrupt particular scenes).

Figure 2:
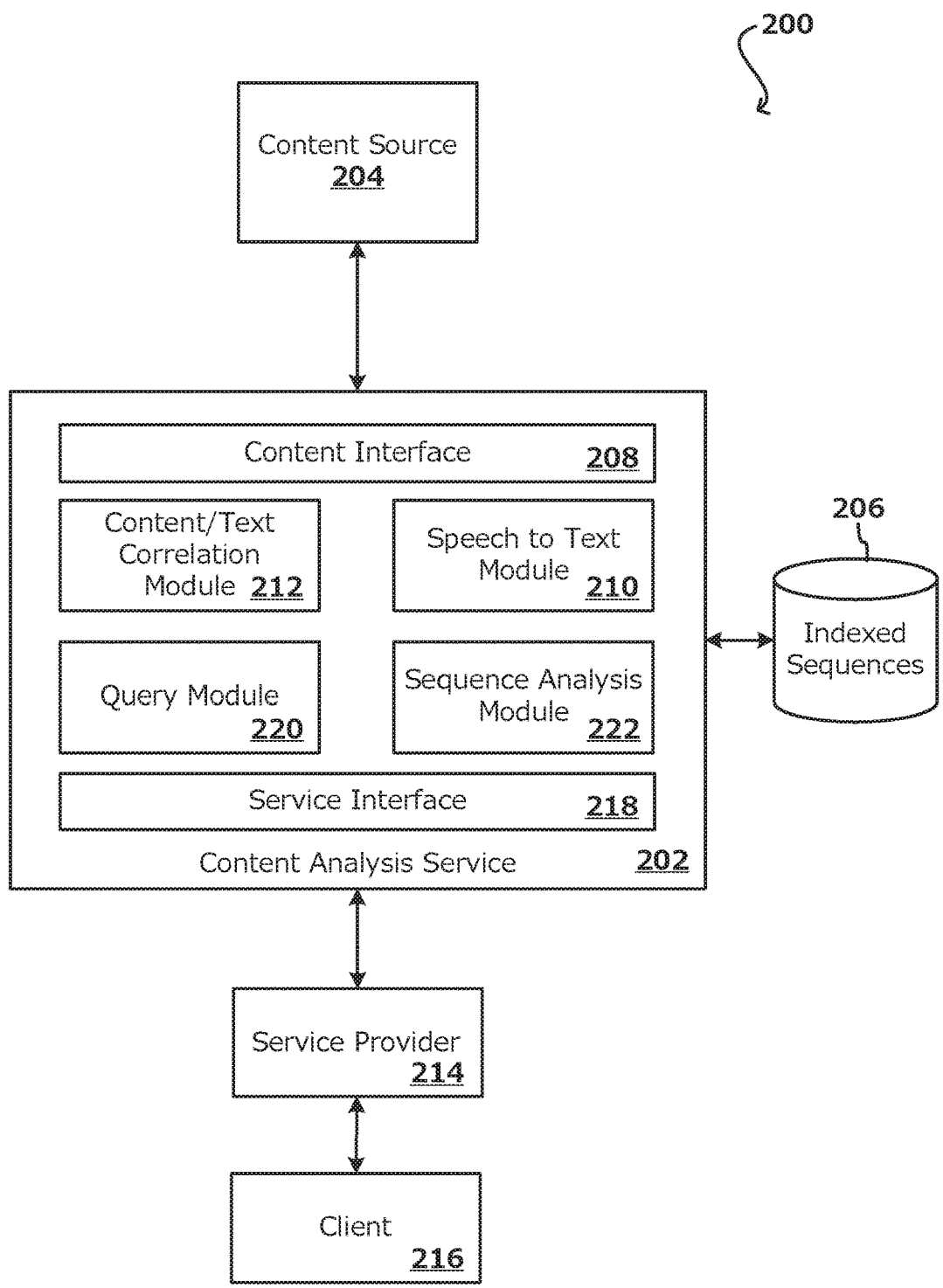
FIG. 2 illustrates a block diagram of an example content analysis system, in accordance with an embodiment.

FIG. 2 illustrates a block diagram 200 of an example content analysis system, in accordance with an embodiment. As shown in FIG. 2, a content analysis service 202 can obtain content from content source 204 and produce indexed sequences 206 of the content. As described further below, content can include video content, content annotations, content transcriptions, and user information such as viewing histories, social media posts, and other information. Content can be stored in various content sources 204, including content repositories, databases, or other data stores. In some embodiments, content sources 204 can include content services including video content streaming services, automated transcription services, social media providers, and other services. Content analysis service 202 can include one or more content interfaces 208, such as Representational State Transfer (REST) interfaces or other web interfaces, to connect to content sources 204.

As shown in FIG. 2, content analysis service 202 can include a Speech to Text (STT) module 210. STT module 210 can be used to analyze content received from content source 204 and to generate a text representation of all or some of the content. STT module 210 can identify multiple speakers in the content and annotate the text representation with timestamps. Timestamp annotations can be added at a predefined frequency, corresponding to a sequence interval time. Different types of video content may be associated with different sequence interval times. For example, video content corresponding to a television show or film may have a sequence interval time of 1 second, while video content corresponding to security camera footage may have a sequence interval time of 10 milliseconds. The annotated text representation can be stored as an indexed sequence 206.

In some embodiments, STT module 210 can identify each speaker in the video using image recognition. For example, a frame from the video content including a current speaker can be extracted. One or more points of interest within the frame (e.g., corresponding to facial features of the speaker) can be identified and compared to a library of images. In some embodiments, the library of images can be generated dynamically based on production data associated with the video content. For example, one content source 204 may include production data (e.g., cast details, production dates, etc.) that is indexed by video content. When video content is retrieved from a content source 204, the corresponding production data may also be obtained. Using the production data, images of cast members can be retrieved from publicly available sources, such as Wikipedia, or other Internet-based source. Once the current speaker is identified, the text representation can be annotated to include identifying information.

In some embodiments, third-party transcriptions can be obtained from content source 204. The third-party transcriptions can be created by users, such as crowd-sourced transcripts of video content, or machine transcriptions, such as automatically generated subtitles. Depending on the source of the third-party transcriptions, the third-party transcriptions may not be annotated with timestamps or other indices. Content/Text Correlation Module 212 can add timestamp annotations to the third-party transcriptions. In some embodiments, STT module 210 can selectively transcribe portions of the content and annotate the transcribed portions with timestamps as described above. The annotated portions can then be matched to the third-party transcription and sequence interval times extrapolated from those portions. Once annotated with sequence interval timestamps, the annotated third-party transcriptions can be stored as indexed sequences 206.

As discussed further below, these indexed text representations can be used to quickly identify particular portions of video content. Content analysis service 202 can expose the indexed sequences to various service providers 214 and/or clients 216 through one or more service interfaces 218. For example, a user can use a search service to look up a scene from a movie using, for example, a line of dialogue. Query module 220 can receive the line of dialogue and construct an appropriate query of indexed sequences 206. However, if the user does not remember the exact quote, then a literal transcription will not be able to identify the relevant portion of content. Accordingly, in some embodiments, a text representation can be enriched to include additional content not found in the video content. For example, word stemming and lemmatization can be applied to each word in the text representation to capture synonyms and multiple inflections of each word. This provides a more robust text representation that can be used to identify a relevant portion of video content without requiring an exact query.

In some embodiments, sequence analysis module 222 can analyze indexed sequences 206 to identify particular portions of the corresponding video content. Content interaction data (e.g., social networking data, user viewing histories, etc.) can be obtained from content source 204. The content interaction data can be aggregated from posts to social network pages, comments, tweets, and other sources. For example, the social networking data may include popular quotes from a movie, screenshots from a popular scene, or other video-related content. In some embodiments, social networking information can be identified as relevant to video content using natural language processing, such as the bag-of-words model. A cluster analysis may be performed on the content interaction data to identify frequently quoted or referenced portions of video content. In some embodiments, such frequently referenced portions can be tagged to indicate popularity. In some embodiments, user viewing histories can be similarly analyzed. When a user streams video content, the portions of the video content the user watches and skips may be monitored. Such data may be analyzed across a user base and used to identify portions of video content that are frequently skipped and portions that are frequently watched in full. These portions may be similarly tagged to indicate popularity.

Using the indexed sequences, one or more approximate time indices associated with a particular portion of video content can be identified. Using the one or more approximate time indices, a logical segment of the video can be identified. A logical segment can include multiple consecutive sequence intervals of the video content. A sliding time window can be used to analyze a particular length of the video at the one or more approximate time indices. Different logical segments may be used depending on application, context information, or as indicated in a request (for example, a user may indicate a maximum length of a clip). Natural language processing may be used to identify the logical segment. For example, a sentence or paragraph spoken by a single character may be identified and used to define a start index and stop index corresponding to a logical segment Similarly, visual cues in the video content may be used to identify a logical segment. For example, in a scene including a dialogue between two actors, a start index may be identified when both actors are first in frame and a stop index may be identified when one of the actors leaves frame. Additionally, or alternatively, changes in background music, brightness, or other cues may be used to define a start index and a stop index of a logical segment. In some embodiments, a variable length logical segment can be identified using an expanding or sliding time window based on the scene.

In some embodiments, sequence analysis module 222 can include one or more machine learning classifiers. Each classifier can be trained to identify a different content characteristic. For example, a scene classifier may be trained to identify a new scene based on changed lighting conditions and/or changes in frame composition that indicate a new location Similarly, a facial recognition classifier may be trained to identify different actors visible in a frame of video content. In some embodiments, classifiers can be used to identify portions of video content with similar content characteristics to a manually identified portion of video content. For example, a portion of video content may be manually identified. Each classifier can identify at least one content characteristic in the portion of video content. The classifiers may then be used to search other video content for portions that have similar content characteristics (e.g., the same actors, scene length, lighting, etc.). Classifiers may also be trained to identify types of scenes in video content. For example, action sequence classifiers may be trained to identify an action sequence based on sound effects, background music, lighting changes, editing techniques, and other characteristics of an action sequence.

As described further below, custom trailers or summary video content may be generated for a user by combining portions of the video content. In some embodiments, the classifiers may analyze the summary videos to identify similar summary videos. For example, the classifiers may determine a particular actor is in a first summary video and that the summary video includes an action sequence. The classifiers may then analyze summary videos generated for other video content to identify a similar second summary video. A recommendation may then be generated for the user to view the second summary video and its corresponding video content.

Figure 3:
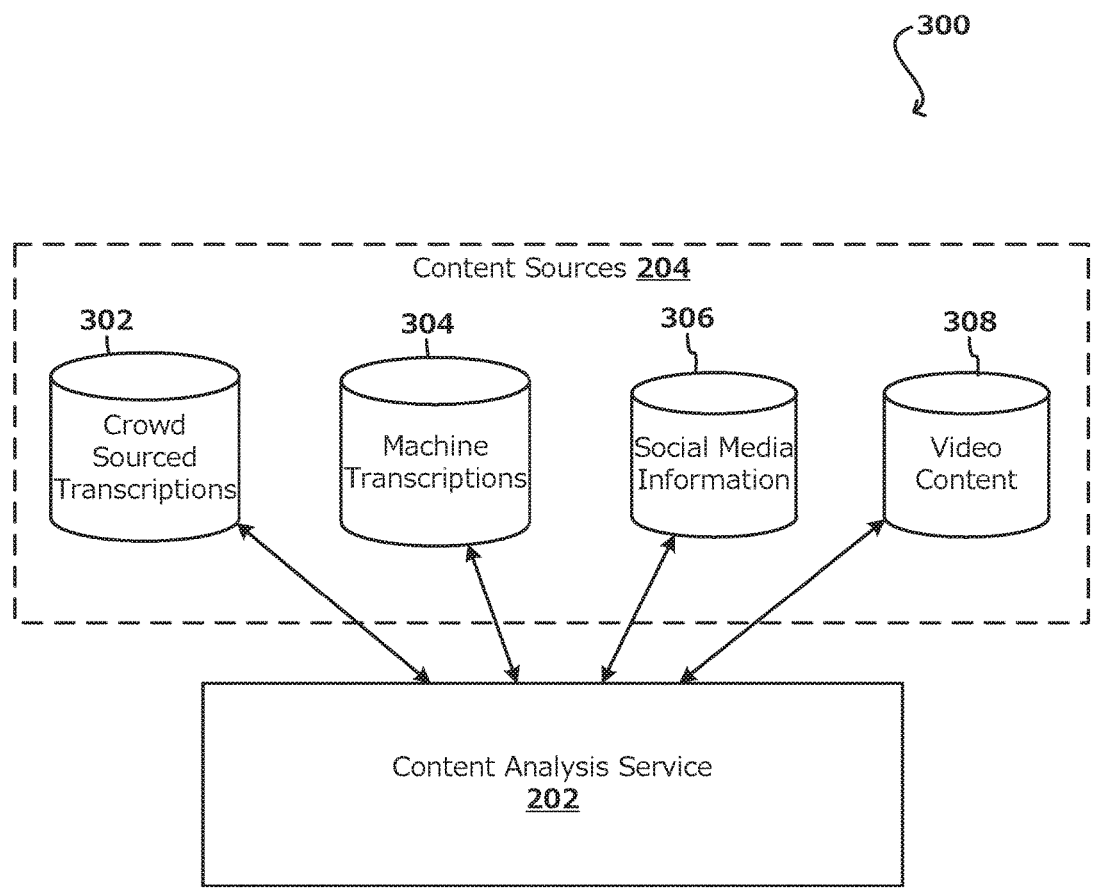
FIG. 3 illustrates a block diagram of an example content acquisition system, in accordance with an embodiment.

FIG. 3 illustrates a block diagram 300 of an example content acquisition system, in accordance with an embodiment. As described above, content sources 204 can include crowd-sourced transcriptions 302, machine transcriptions 304, social media information 306, and video content 308. Crowd-sourced transcriptions 302 and machine transcriptions 304 can be obtained from web-based transcription services, closed captioning services, digitization and archive services, knowledge-bases, or other information repositories. Social media information 306 can include comments, posts, tweets, and other social media information. Video content 308 can be obtained from video streaming services, content management services, local or remote storage systems, or other content distribution services.

In some embodiments, social media information 306 can be analyzed to identify demographic information associated with the social media information. When a portion of video content has been identified based on the social media information, gender, age, marital status, location, and other information associated with the social media information can be determined. For example, the demographic information may be determined from user profiles associated with the social media information. The demographic information may be added as tags or metadata associated with the portion of the video content. This may be used to recommend the portion of video content to other users having similar demographic characteristics.

Figure 4:
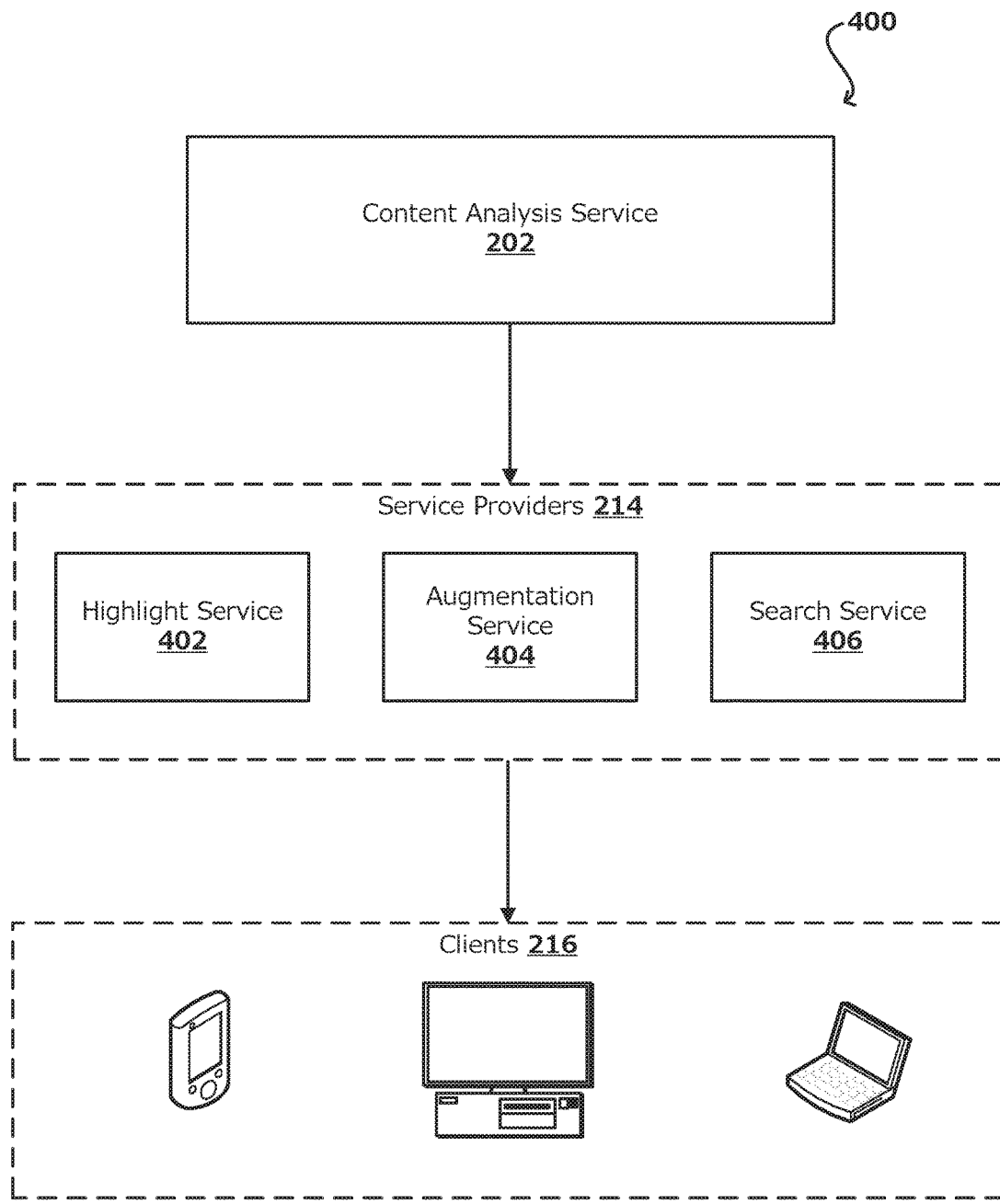
FIG. 4 illustrates a block diagram of an example content distribution system, in accordance with an embodiment.

FIG. 4 illustrates a block diagram 400 of an example content distribution system, in accordance with an embodiment. As described above, content analysis service 202 can expose the indexed sequences to one or more service providers 214. As shown in FIG. 4, service providers 214 can include a plurality of different service providers 402, 404, 406. Although service providers 214 are depicted as separate from content analysis service 202, this is for simplicity of description. Service providers 214 can include third-party service providers and/or integrated services, provided by content analysis service 202.

In one example, service providers 214 can include a highlight service 402. Highlight service 402 can generate a summary of longer video content, such as a custom trailer. Popular sections of video content can be identified based on how users are interacting with, or consuming, the video content. For example, social networking data can be aggregated and analyzed to identify frequently referenced lines or scenes. The indexed sequences can be queried based on the referenced lines or scenes to determine a time index associated with each line or scene. Using the time index, logical segments can be identified that include the referenced material. The length of the logical segments may vary depending on the type of video content, the referenced line or scene, or other context information. The highlight service 402 can then generate modified video content that is limited to those logical segments of the video that have been identified as being frequently referenced.

For example, when a user is browsing video content, a custom trailer may be generated for a video content item recommended to the user. The custom trailer can generated as described above by determining portions of the video content from user interaction information. In some embodiments, information associated with the user may be used to generate a personalized trailer. For example, demographic information associated with the user (age, gender, marital status, location, etc.) may be determined and then used to determine which portions of the video content are used for the trailer. As described above, portions of video content may be tagged with demographic information based on the user interaction data, indicating that users having a particular demographic profile have been more likely to interact with those portions of the video content (e.g., write posts, tweet, like, or otherwise interact with the portions).

In one example, service providers 214 can include an augmentation service 404. Augmentation service 404 can identify one or more time indices in video content at which to insert additional content. The one or more time indices can be based on particular portions of the video content. For example, if augmentation service 404 is an advertising service, time indices associated with multiple portions of the video content may be used to determine advertising breaks. The portions may be popular portions of the video content identified using content interaction data as discussed above. This is useful in video content that does not include act breaks, chapter breaks, or other conventional advertising points. By identifying time indices associated with popular portions of the video content, insertion points for advertisements can be identified where the advertisements do not interrupt the popular portions of the video content, providing an improved user experience.

In one example, service providers 214 can include a search service 406. Search service 406 can receive a user input, such as text of a quote, and construct a query to search indexed sequences 206. As described above, one or more time indices for video content matching the query can be returned in response to the query. A logical segment of the video content that includes the one or more time indices can then be identified and provided for display on client 216. By providing discrete logical segments of video content, the amount of video content transferred between a video service and a client can be reduced leading to reduced overall bandwidth requirements.

Figure 5:
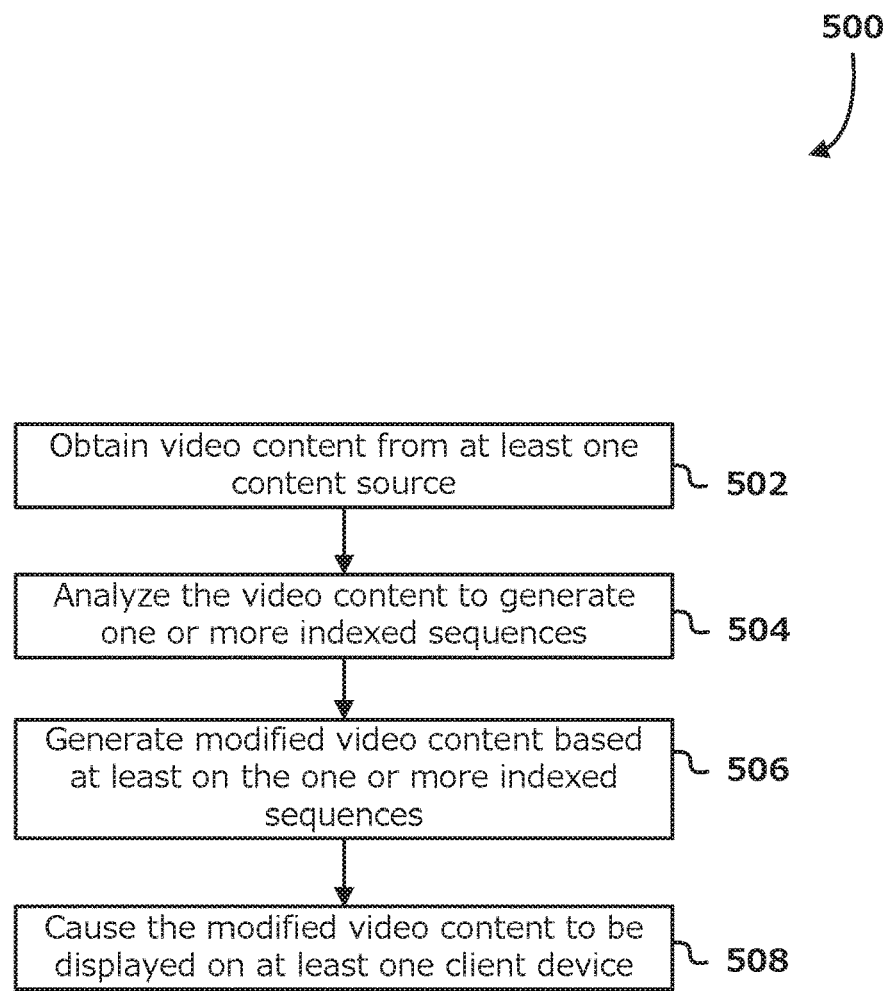
FIG. 5 illustrates a method of content analysis, in accordance with an embodiment.

FIG. 5 illustrates a method 500 of content analysis, in accordance with an embodiment. In this example, video content is obtained 502 from at least one content source. As discussed, content sources can include video streaming services, local or remote storage systems, content management services, or other data stores.

In some embodiments, the video content can be analyzed 504 to generate one or more indexed sequences that correspond to portions of the video content identified in content interaction information. The indexed sequences can include a text representation of the video content that has been annotated with sequence interval timestamps. As discussed, the indexed sequences can also include annotations that describe actors, locations, or other content information for the video content. Additionally, portions of the indexed sequences can be tagged to indicate popular, important, or otherwise identified scenes or other logical segments of the video content.

In some embodiments, a third-party transcription (e.g., a crowd sourced transcription and/or a machine transcription) associated with the video content can be obtained from a third-party transcription service. As discussed, third-party transcriptions can be correlated to the video content by identifying reference indices in the video content and transcribing portions of the video content corresponding to those reference indices. These transcribed portions can then be matched to the third-party transcription and annotated with corresponding timestamps.

Modified video content can be generated 506 based at least on the one or more indexed sequences. The modified video content can represent a summary of the video content, such as a custom trailer, that includes one or more logical segments of the video content. The modified video content can be an augmented video content that includes additional information, such as advertisements, production details, or other information. The modified video content may then be displayed 508 on a client device.

In some embodiments, the indexed sequences can be queried to identify a matching time index in the video content. As discussed, the time index can be used to identify a corresponding logical segment (line, shot, scene, etc.) of the video content which may be returned in response to the query.

As discussed, in some embodiments, classification data can be received from reviewers. The classification data can include content characteristics associated with at least one indexed sequence of the video content. The classification data can be used to train classifiers to identify similar portions in other video content. For example, once trained the classifiers can automatically identify at least one portion of a different video content that includes the content characteristics.

Figure 6:
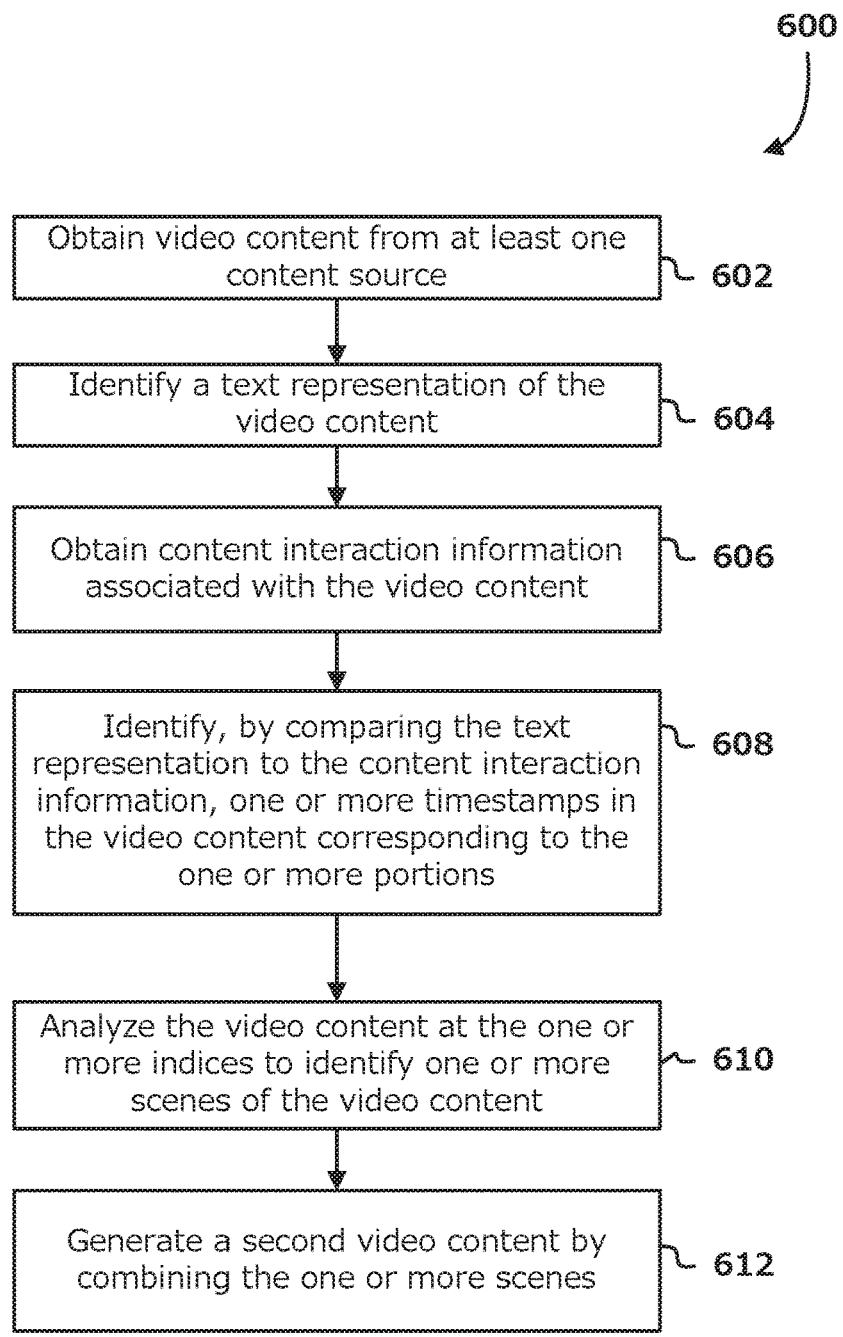
FIG. 6 illustrates a method of content analysis, in accordance with an embodiment.

FIG. 6 illustrates a method 600 of content analysis, in accordance with an embodiment. In this example, video content is obtained 602 from at least one content source. As described above, the video content can include audio data and image data. As discussed, the content sources can include video streaming services, local or remote storage systems, content management services, or other data stores.

In various embodiments, a text representation of the video content can be identified 604. The text representation can include a transcription of the audio data as well as annotations related to the video content, such as timestamps. The text representation can be generated from the video content using speech to text or similar techniques, or can be retrieved from a third-party service. In some embodiments, the text representation can be enriched to include additional content not found in the video content. For example, word stemming and lemmatization can be applied to each word in the text representation to capture synonyms and multiple inflections of each word.

As discussed, content interaction information indicating user interest in various portions of the video content can be obtained 606. The content interaction data can be aggregated from posts to social network pages, comments, tweets, and other sources. The content interaction data can also include aggregated user viewing histories that indicate portions of the video content users watch and portions users skip. Such data may be analyzed across a user base and used to identify portions of video content that are frequently skipped and portions that are frequently watched in full.

The content interaction information can be compared to the text representation to identify 608 one or more portions of the video content. For example, a cluster analysis may be performed on the content interaction data to identify frequently quoted or referenced portions of video content based on the social networking data and viewing histories. The timestamps, or other indices, in the video content can be used to identify a specific time of the video content. The video content can be analyzed 610 at these timestamps to identify corresponding scenes, or other logical segments (such as shots, individual lines, etc.) of the video content. At 612, a second video content can be generated by combining the various scenes. For example, a start timestamp and an end timestamp can be identified for each scene. The video content between those indices (including audio data and image data) can be extracted from the video content and saved. This can be repeated for each identified scene. Once each scene has been extracted, the scenes can be combined into a new video content.

Figure 7:
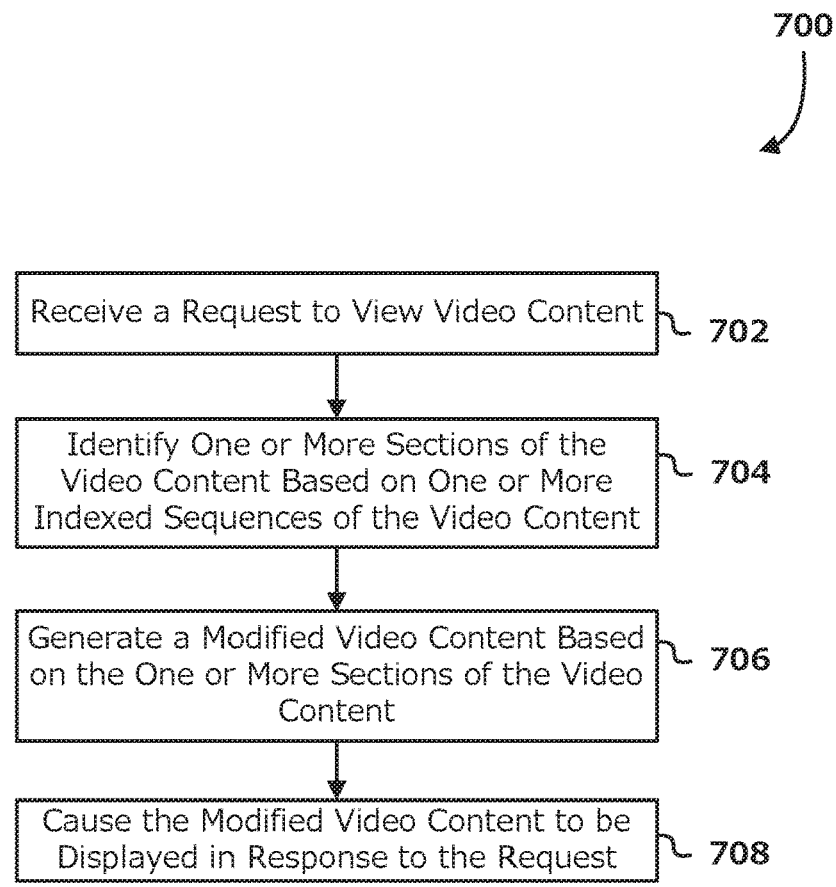
FIG. 7 illustrates a method of content distribution, in accordance with an embodiment.

FIG. 7 illustrates a method 700 of content distribution, in accordance with an embodiment. As discussed above, the indexed sequences of video content can be used by various service providers to distribute modified video content to users. In some embodiments, users may interact directly with content analysis service 202 to receive video content or the users may receive video content from one or more service providers. The service providers may be third party service providers that access the video content and indexed sequences through one or more service interfaces. In some embodiments, the service providers may represent front-end user interfaces provided by content analysis service 202 to facilitate user interaction.

In various embodiments, a request can be received at 702 to view video content. As discussed, the request can be received from a client device or through a service provider. One or more sections of the video content can be identified at 704 based on one or more indexed sequences of the video content. In some embodiments, the sections can be identified by querying the indexed sequences based on the request.

In some embodiments, a modified video content based on the one or more sections of the video content can be generated at 706. As discussed, the modified video content may be a highlight video that includes portions of the video content, or the modified video content may be an augmented video that includes additional content incorporated into the video content at particular time positions. At 708, the content analysis service can return the modified video content in response to the request received at 702.

Some or all of the processes 500, 600, 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 8:
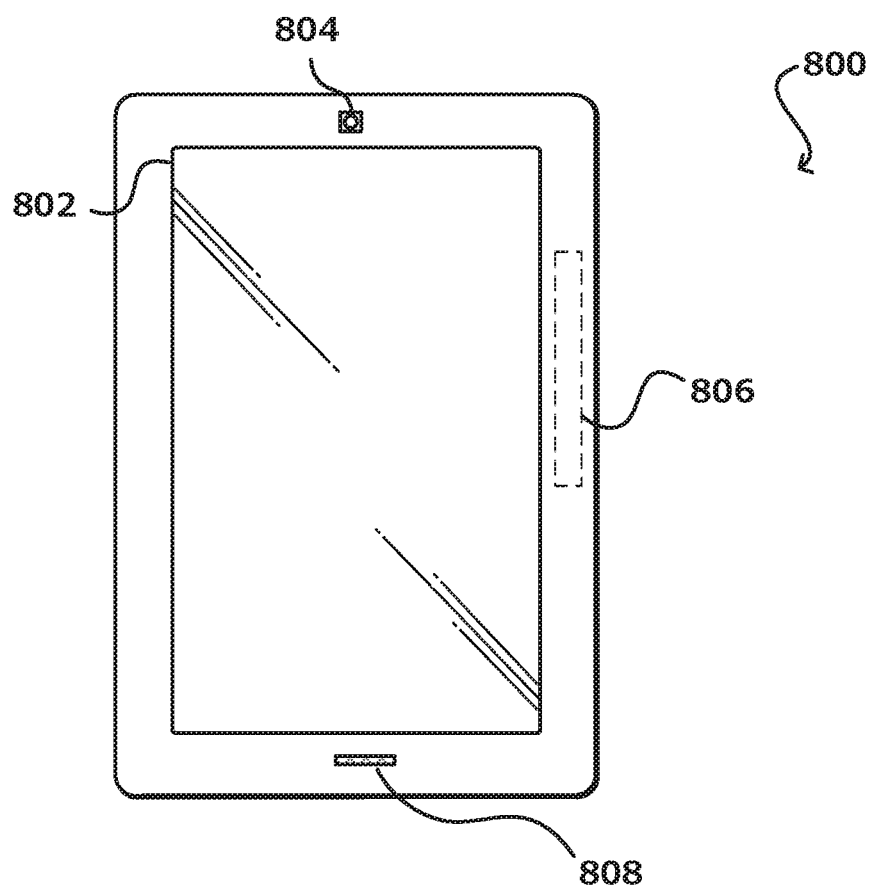
FIG. 8 illustrates an example device that can be used to implement aspects of the various embodiments.

FIG. 8 illustrates an example device 800 that can be used to implement aspects of the various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 800 has a display screen 802 on the front side, which under normal operation will display information to a user facing the display screen (e.g., on the same side of the computing device as the display screen). The computing device in this example includes at least one camera 804 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 800 also includes at least one microphone 806 or other audio capture device capable of capturing audio data, such as words or commands spoken by a user of the device. In this example, a microphone 806 is placed on the same side of the device as the display screen 802, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 800 also includes at least one orientation sensor 808, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 9:
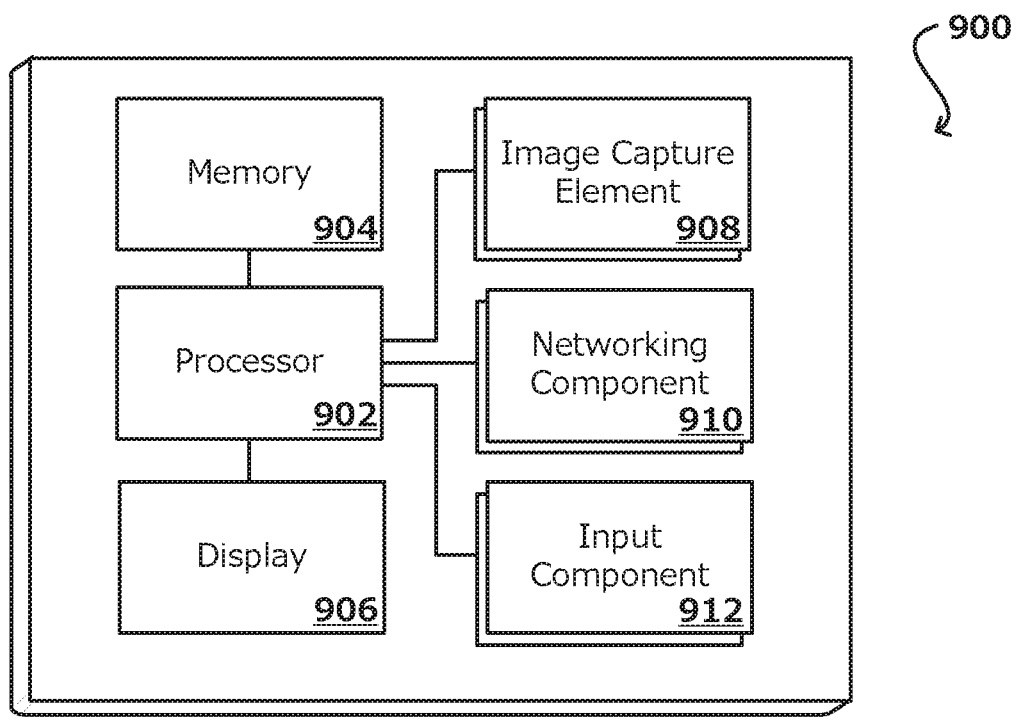
FIG. 9 illustrates example components of a client device such as that illustrated in FIG. 8.

FIG. 9 illustrates a logical arrangement of a set of general components of an example computing device 900 such as the device 800 described with respect to FIG. 8. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one image capture element 908 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component, such as a mono or stereo microphone or microphone array, operable to capture audio information from at least one primary direction. A microphone can be a uni- or omni-directional microphone as known for such devices.

In some embodiments, the computing device 900 of FIG. 9 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input component 912 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 900 also can include at least one orientation or motion sensor or component 910. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 902, whereby the device can perform any of a number of actions described or suggested herein.

As an example, a computing device such as that described with respect to FIG. 8 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 10:
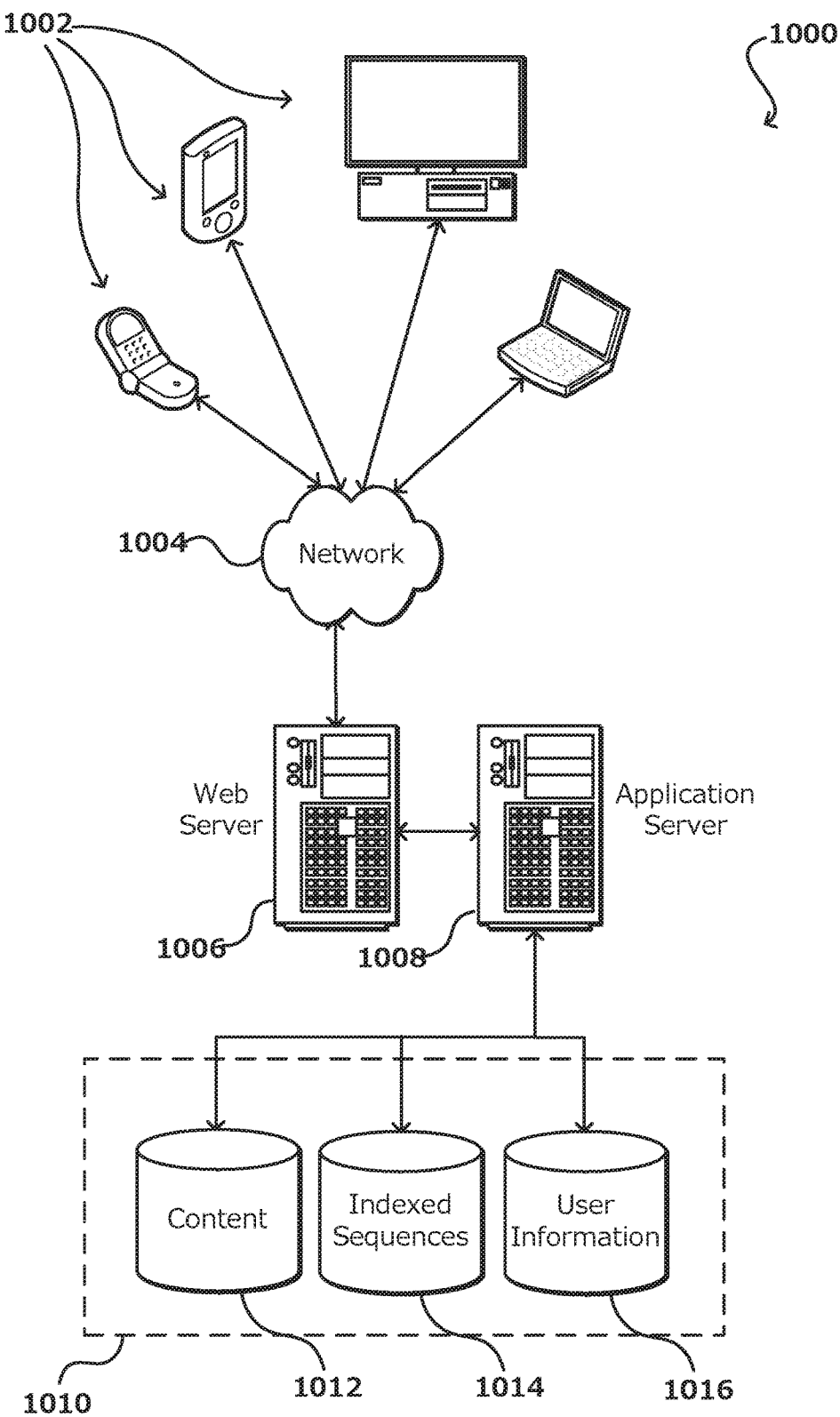
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content 1012, indexed sequences 1014, and user information 1016. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining video content from a content source;
    obtaining content interaction information associated with the video content and corresponding to data reflecting user actions with the video content, the content interaction information comprising historical activity of a plurality of users;
    identifying a portion of the video content based at least in part on the content interaction information;
    analyzing the portion of the video content to generate an indexed sequence of the portion of the video content; and
    modifying the video content based at least in part on the indexed sequence to generate modified video content.

2. The computer-implemented method of claim 1, wherein the content interaction information comprises aggregating historical activity of the plurality of users, the historical activity comprising actions of the plurality of users, the actions associated with the portion of the video content.

3. The computer-implemented method of claim 1, further comprising:
    identifying, by comparing a text representation corresponding to audio data of the video content and the content interaction information, one or more timestamps in the video content corresponding to the portion of the video content.

4. The computer-implemented method of claim 1, further comprising:
    displaying the modified video content on a user device.

5. The computer-implemented method of claim 1, further comprising:
    storing the modified video content for access by a user via a user device.

6. The computer-implemented method of claim 1, further comprising:
    identifying popular portions of the video content based at least in part on social media information; and
    generating the modified video content based at least in part on the popular portions, wherein the popular portions correspond to the portion of the video content.

7. A computer-implemented method, comprising:
    obtaining video content from a content source;
    obtaining content interaction information associated with the video content and corresponding to data reflecting user actions with the video content, the content interaction information comprising historical activity of a plurality of users;
    using the content interaction information to identify a portion of the video content;
    analyzing the portion of the video content to generate an indexed sequence of the portion of the video content;
    modifying the video content based at least in part on the indexed sequence to generate modified video content; and
    storing the modified video content for access by a user via a user device.

8. The computer-implemented method of claim 7, wherein analyzing the portion of the video content to generate the indexed sequence comprises:
obtaining at least one third-party transcription associated with the video content, the at least one third-party transcription including one or more of a crowd sourced transcription and a machine transcription.

9. The computer-implemented method of claim 7, further comprising:
identifying a reference portion in the video content;
transcribing the portion of the video content corresponding to the reference portion; and
generating a timestamp associated with the transcribed portion of the video content.

10. The computer-implemented method of claim 7, wherein the modified video content comprises a plurality of indexed sequences and one or more annotations corresponding to content information for the video content.

11. The computer-implemented method of claim 10, wherein the content information comprises actors appearing in the video content, locations associated with the video content, popular scenes, important scenes, or a combination thereof.

12. The computer-implemented method of claim 7, further comprising:
receiving classification data from one or more reviewers, the classification data including one or more content characteristics and the indexed sequence of the video content; and
training one or more classifiers based at least on the classification data.

13. The computer-implemented method of claim 5, wherein the content source comprises one of video content stored locally on a client device, video content stored remotely on an accessible storage device, or a video streaming service.

14. A system, comprising:
at least one processor; and
memory storing instructions that, when executed by the at least one processor, cause the system to:
obtain video content from a content source;
obtain content interaction information associated with the video content and corresponding to data reflecting user actions with the video content, the content interaction information comprising historical activity of a plurality of users;
use the content interaction information to identify a portion of the video content;
analyze the portion of the video content to generate an indexed sequence of the portion of the video content; and
modify the video content based at least in part on the indexed sequence to generate modified video content.

15. The system claim 14, wherein analyzing the portion of the video content to generate the indexed sequence comprises:
obtaining at least one third-party transcription associated with the video content, the at least one third-party transcription including one or more of a crowd sourced transcription and a machine transcription.

16. The system of claim 14, wherein the instructions when executed further cause the system to:
identify a reference portion in the video content;
transcribe the portion of the video content corresponding to the reference portion; and
generate a timestamp associated with the transcribed portion of the video content.

17. The system of claim 14, wherein the modified video content comprises a plurality of indexed sequences and one or more annotations corresponding to content information for the video content.

18. The system of claim 17, wherein the content information comprises actors appearing in the video content, locations associated with the video content, popular scenes, important scenes, or a combination thereof.

19. The system of claim 14, wherein the instructions when executed further cause the system to:
evaluate social media content to determine a popular scene from the video content, wherein the popular scene is determined by a number of references to the popular scene being above a threshold; and
generate updated modified video content that includes the popular scene.

20. The system of claim 14, wherein the modified video content is an augmented video content comprising third-party content added at an index of the video content corresponding to the indexed sequence.

* * * * *